(12) United States Patent
Sams et al.

(10) Patent No.: US 7,817,154 B1
(45) Date of Patent: Oct. 19, 2010

(54) GRAPHICS SYSTEM WITH STATE TRANSITION CACHING

(75) Inventors: Rudy Jason Sams, San Jose, CA (US); Nicholas B. Carter, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 892 days.

(21) Appl. No.: 11/609,562

(22) Filed: Dec. 12, 2006

(51) Int. Cl.
G06F 15/00 (2006.01)
G06T 1/00 (2006.01)
G09G 5/36 (2006.01)

(52) U.S. Cl. .......................... 345/501; 345/557
(58) Field of Classification Search ................ 345/557; 719/322, 323, 327
See application file for complete search history.

(56) References Cited

U.S. PATENT DOCUMENTS

| 6,952,215 B1* | 10/2005 | Devins et al. ............... 345/522 |
| 7,027,972 B1* | 4/2006 | Lee .............................. 703/22 |
| 2006/0265568 A1* | 11/2006 | Burton ....................... 711/216 |

* cited by examiner

Primary Examiner—Kee M Tung
Assistant Examiner—Jacinta Crawford
(74) Attorney, Agent, or Firm—Cooley LLP

(57) ABSTRACT

A graphics system has output states corresponding to a transformation of a user state of a software application to a graphics hardware state. The graphics system utilizes a technique, such as a conventional output state cache, to recognize that the overall state vector has taken on a previously-seen value. Additionally, a transition cache maps transitions in changing input state to changing output state. The transition cache is used to provide an alternative technique to determine output states based on transitions of input state.

19 Claims, 5 Drawing Sheets

GRAPHICS SYSTEM WITH STATE TRANSITION CACHING

FIELD OF THE INVENTION

The present invention is generally related to techniques to cache transformations between input states generated by a graphics application to output hardware states in a graphics system.

BACKGROUND OF THE INVENTION

FIG. 1 illustrates a prior art graphics system 100 having a central processing unit (CPU) 105 and a graphics processing unit (GPU) 110. GPU 110 has graphics hardware, such as a graphics pipeline 115. A memory 130 stores programs that execute on CPU 105. A graphics application 135 generates graphical commands. A graphics driver 140 converts the abstract graphics commands into a format the graphics hardware of GPU 110 can utilize to render an image. Thus, the graphics driver 140 can be understood as receiving inputs from the graphics application 135 and generating outputs for GPU 110.

The sets of inputs and outputs of graphics driver 140 will have associated states. Consequently, the function of graphics driver 140 can also be understood in terms of performing a mapping between a set of input states and a set of output states 118 received by GPU 110. The input state is also sometimes known as the "user state." The output state is sometimes known as a "hardware state" because the output state is in a format that graphics hardware can utilize. Examples of user state include a fragment program, a depth function, and a stencil testing function. As the user state associated with the graphics application evolves the output state generated by the graphics driver will also change. The output of the graphics driver includes, for example, graphics commands and other information sent to the GPU. Examples of output state include a micro-coded program executed on the graphics hardware or a vertex array state (e.g., pointers or formats).

As an input (user state) evolves an appropriate output state for the graphics hardware needs to be determined by the graphics driver. There can be a significant computational cost associated with calculating a transformation from an input state to an output state. Consequently, in the prior art output states were sometimes cached using an output state cache 145 to store a representation of output state that could be reused. As an example, in the prior art a graphics application could render a scene in a particular way, such as to render a state of character A and then to render a state of character B. For some types of applications the same graphics operations occur repetitively, such as repetitively within a scene or between frames. As a result, graphics driver 140 would use an output state cache 145 to reuse a transformation that was performed repetitively.

FIG. 2 illustrates in more detail a sequence of steps performed by graphics driver 140 to utilize output state cache 145. Output state cache 145 stores a full set of recently used output states constrained by some maximum cache limit and/or a cache policy. User input state values 205 were hashed to compute indexing keys 210 into the output state cache 145. That is, each output state was separately indexed by a key to a respective input state value. A lookup key operation 215 could then be subsequently used to map a user input state to an output state.

A drawback of using output state cache 145 is that it becomes inefficient as the number of states increases. Performing a hash operation on a set of input states to compute keys and perform a lookup becomes computationally expensive when the number of input states increases. In particular, computing the hash key is computationally expensive. As a consequence, the system of FIG. 1 has performance problems when the number of input states increases beyond a certain number.

In light of the problems described above, the apparatus, system, method, and computer readable medium of the present invention was developed.

SUMMARY OF THE INVENTION

A graphics system has output states corresponding to a transformation of a user state of a software application to a graphics hardware state. A conventional technique to determine output states based on transitions of input state is provided, such as a conventional output state cache which conventionally requires computation of a hash key to perform a lookup. However, conventional techniques to determine output states based on input states are computationally expensive when there are a large number of states that evolve over time. A transition cache is also provided that maps transitions in changing input state to changing output state. The transition cache is used in combination with a conventional technique to determine output states based on transitions of input state, such as a conventional output state cache. In one embodiment, the transition cache is used to perform a mapping based on a representation of a delta change between states and the transition cache is used to generate pointers to access cached output states.

One embodiment of a method of transforming input user states to output states for graphics hardware includes caching transformations of input states to output states to generate a cache of output states for reuse. Additionally, the method includes caching a representation of transitions of input states to output states to generate a transition cache of state transitions. The transition cache is utilized to map an input state transition into an output state of said cache of output states.

One embodiment of a graphics system includes a graphics processing unit (GPU) and a central processing unit (CPU) communicatively coupled to the GPU. The CPU has an associated memory for storing a software application operative to generate user input commands. The user input commands require transformation in order to be executed by graphics hardware of the graphics processor. The graphics system caches a mapping of transitions of input states to cached output states. The graphics system has a mode of operation in which transitions in input state are tracked to generate a transition cache which is used to generate pointers to access cached output states.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
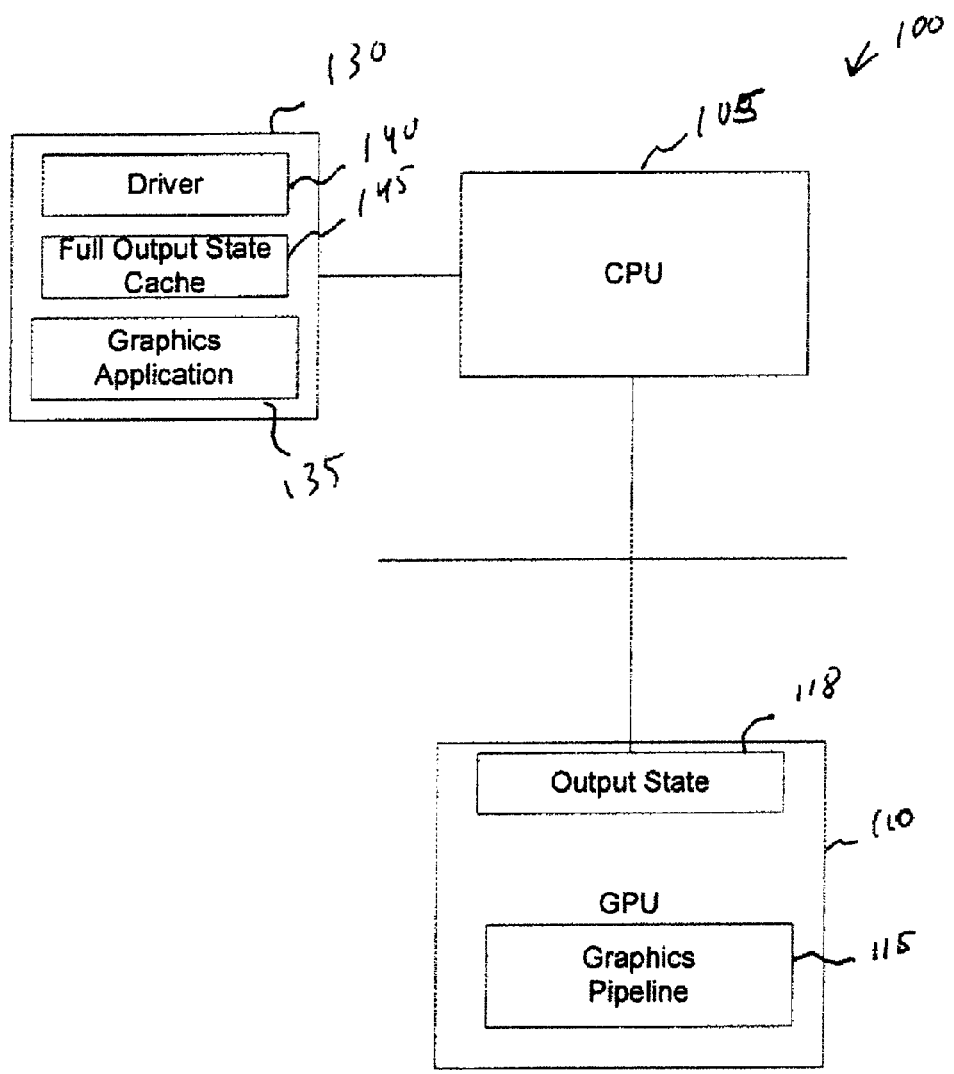
FIG. 1 illustrates a prior art graphics system having a driver utilizing output state caching.
Figure 2:
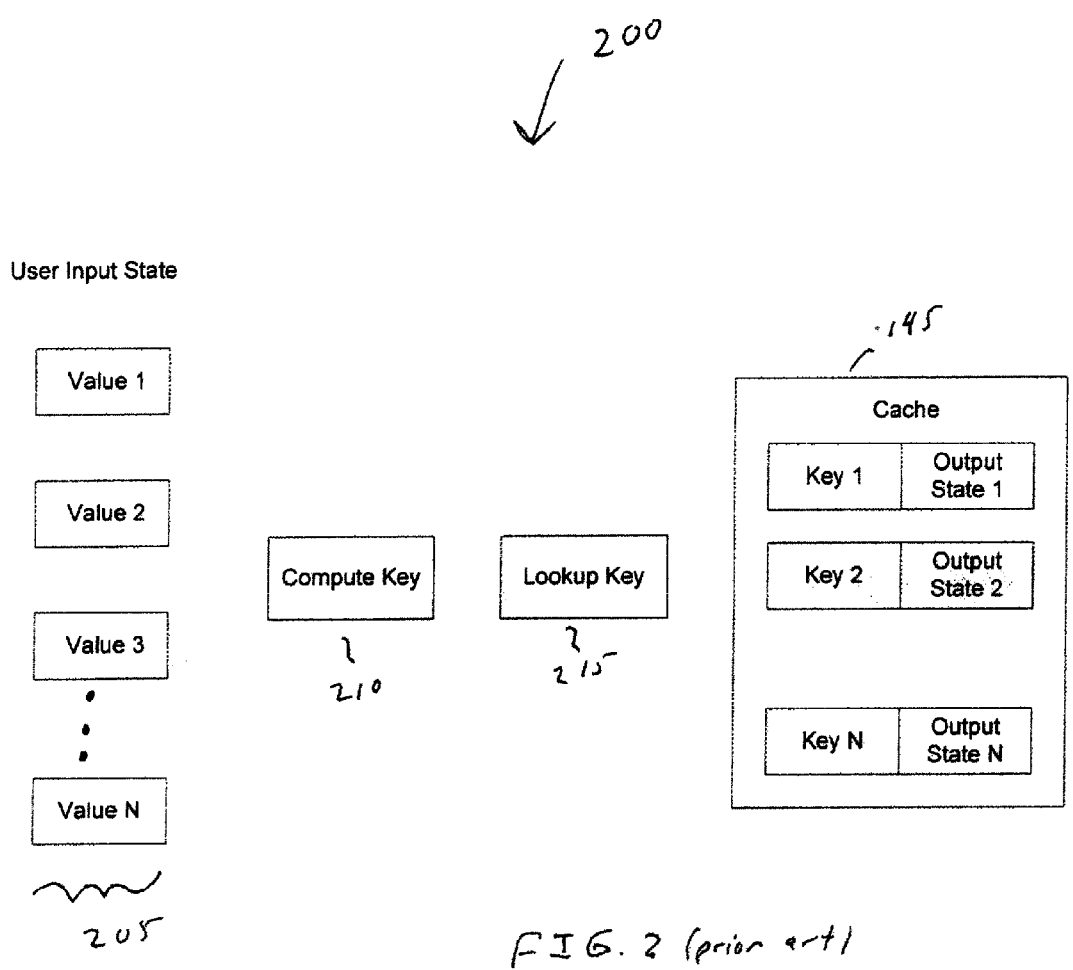
FIG. 2 illustrates in more detail a prior art method for a driver to utilize an output state cache.
Figure 3:
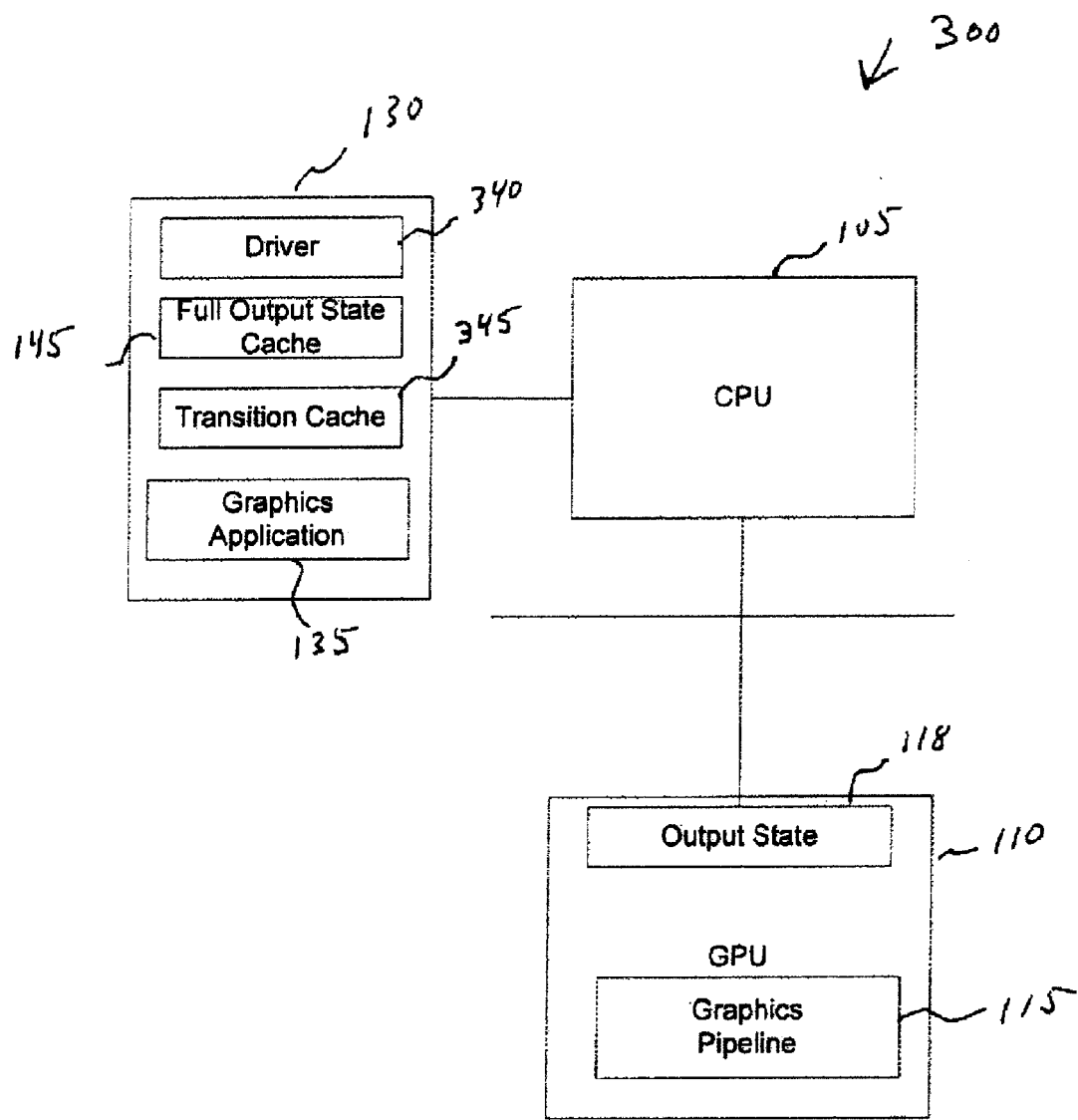
FIG. 3 illustrates a graphics system utilizing state transition caching in accordance with one embodiment of the present invention.

FIG. 3 illustrates a graphics system 300 in accordance with one embodiment of the present invention. Graphics system 300 includes a CPU 105, GPU 110, graphics pipeline 115, and system memory 130. A graphics driver converts software commands of graphics application 135 into a format that graphics pipeline 115 of GPU 110 can interpret. The conversion process includes performing transformations of input states to output states. The transformation from one vector space to another output vector space can, however, be comparatively expensive in terms of computational resources. A conventional full output state cache 145 is preferably generated to permit re-use of transformations of input state to output state. Output state cache 145 may, for example, have a cache size setting a cache size and a cache entry retention policy to facilitate caching frequently used output states. The entries in output state cache 145 will thus evolve over time, depending upon the execution of graphics application 135 and the cache retention policy details.

In one embodiment, graphics system 300 includes a conventional mode of operation in which a conventional lookup key technique is used to map input state values to output states stored in full output state cache 145. Since the entries in output state cache 145 evolve over time, a lookup index needs to be dynamically generated using, for example, hashing of the entire set of input user states. However, a drawback of this conventional mode of operation is that it is computationally expensive to perform abashing function to generate lookup keys when there are a large number of states. Note that in some instances only a few of the possible states may have changed since the last hash computation. But in the conventional mode of operation, all states may be considered to perform a cache operation, rather than only those states that have changed. As an illustrative example, a graphics system may have sixty or more input user states and a small number (e.g., five) may have changed since the last lookup such that there is considerable computational overhead associated with performing hashing using the conventional approach.

A transition cache 345 is generated to support a mode of operation in which a transition in input state (e.g., a change in state between two state values) is used to lookup the current output state. That is, instead of looking at full input state values and performing a hashing function to determine output states, a mapping is performed based on a representation indicative of a "delta" change between states. The transition cache 345 needs only to store sufficient information to identify transitions in a vector space with respect to a state diagram. That is, during a lookup operation the transition cache needs only consider a sequence of state transitions which, if recognized as having been previously seen, point to the output state.

In many graphics applications there may be a large number of state values such that the state diagram has many nodes. In structured programming models certain input state transitions will tend to occur repeatedly. However, graphics applications may repeat certain operations over and over during a scene. As a result, certain input state transitions may occur frequently during the rendering a scene. This permits cached output states to be identified with respect to a lookup performed on transition cache 345. Even in applications with a large total number of input states, the number of frequently used transitions will generally be less than the total number of inputs states. As an illustrative example, if there are sixty or more input states, the number of frequently used transitions may be much smaller, e.g., ten to twenty frequent transitions in some cases. Consequently, there are significant computational benefits associated with using transition cache 345 as a lookup index into cached output states.

In one implementation, transition cache 345 and full output state cache 145 are generated by driver 340. However, more generally transition cache 345 and full output state cache 145 may be stored in any memory of graphics system 300 and/or generated by other entities in the graphics system. In particular, it is contemplated that in an alternate embodiment state caching may be implemented within GPU 110.

Figure 4:
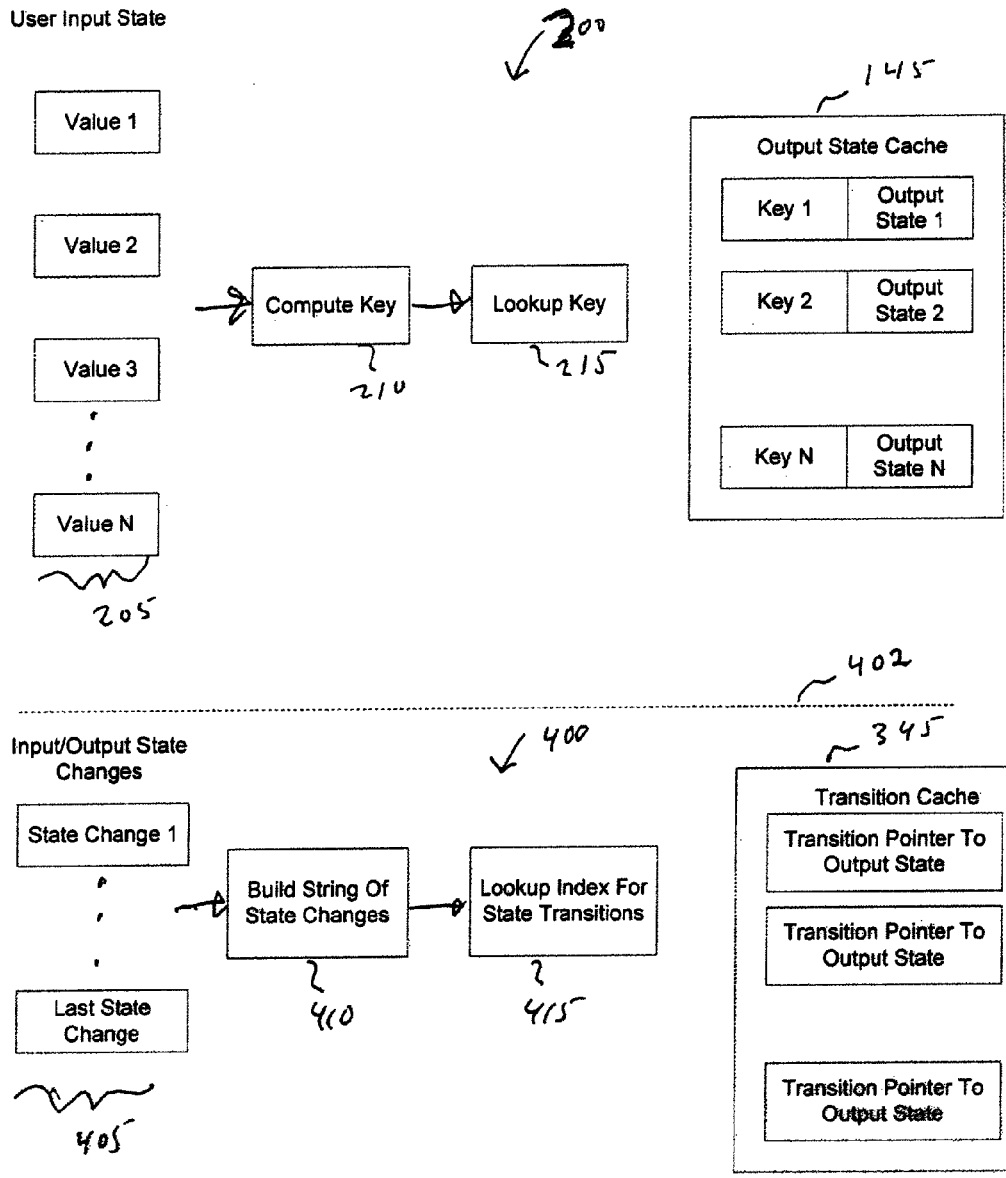
FIG. 4 illustrates a method of using state transition caching in accordance with one embodiment of the present invention.

FIG. 4 illustrates a method of utilizing cached output state values in accordance with one embodiment of the present invention. In a typical application, transition cache 345 is used as an auxiliary to a conventional cache, or something performing a similar function. As previously described, in one embodiment graphics system 300 has a first mode 200 in which a conventional method is provided to generate a compute key 210 and then perform a lookup key operation to match full values of user input state 205 to entries in output state cache 145. This can include, for example, performing a hashing function on all N values of input user state 205, where N is an integer (e.g., sixty values of input user state). The conventional method 200 is reliable but requires significant computational resources for applications where the state diagram has a large number, N, of state nodes.

As indicated by dashed line 402, a second mode of operation 400 operates in parallel with the conventional mode 200. In second mode 400, a transition cache 345 is used as a pointer to cached output states, where the cached output states may reside in full output state cache 145 or cached in a copy thereof. State changes 405 are monitored to build a representation of a string of stage changes 410 in transition cache 345. With each modification (delta) of state from an initial starting state the string of state changes is built up and stored. In one implementation, a lookup index 415 to transition cache 345 is generated based on a hash function. The transition cache 345 can thus be used to lookup transitions to output state nodes. That is, the transition cache 345 caches string changes in a format sufficient to generate pointers to a transition to a new output state in output state cache 145. However, since transition cache 345 does not have to store a full set of output state values, transition cache 345 can be comparatively small in size compared to a conventional full output state cache 145. Additionally, transition cache 345 may be implemented in a manner in which it stores a lightweight representation of state transitions, such as a numeric code or tokens indicative of states.

As an illustrative example, consider a graphics application generating a string of application programmable interface (API) calls, such as OpenGL® calls. To build a string of API calls from an application, the graphics driver may convert the string of API calls into tokens representing the API calls. As an example, an API call such as the OpenGL® bind texture command requires 32 bit data but may be converted into two tokens. In this example, when the graphics driver needs to lookup a result in the output state, it hashes the string of API tokens as a lookup into transition cache 345 to generate a pointer to the next node in the output state. If the lookup operation fails, the conventional method 200 is used as a backup mode.

Figure 5:
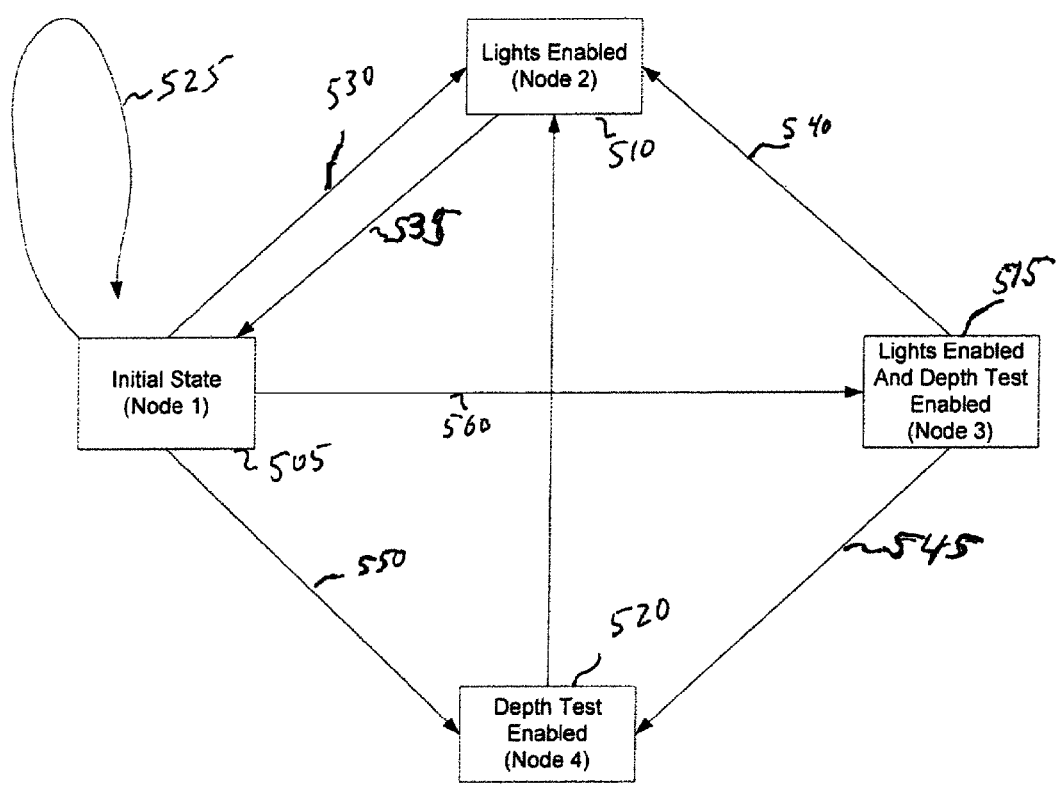
FIG. 5 is a state diagram illustrating aspects of state transition caching in accordance with one embodiment of the present invention.

FIG. 5 illustrates an exemplary state diagram 500 for four nodes corresponding to an initial state 505, lights enabled state 510, a light enabled and depth test enabled state 515, and a depth test enabled state 520. Note that these states can also be referenced by tokens that are multi-bit identifiers such as bit values corresponding to a numeric value for node 1, node 2, node 3, and node 4, numeric values 1, 2, 3, and 4. Several exemplary state transition vectors 525, 530, 535, 540, 545, 550, and 560 are illustrated. As the state diagram is traversed, a cached string of tokens corresponding to node codes is generated indicative of the current state of the state diagram. For example, the transition along vector 530 results in the node code changing to a node code of "2" for the lights enabled state. A transition along vector 560 to the light enabled and depth test enabled state 515 results in the node code changing to a node code of "3." A transition along vector 545 to the depth test enabled state 520 results in the node code changing to "4." A redundant transition corresponding to enabling light and then disabling lights along vector 525 results in the state remaining at the initial state 505, corresponding to a node code of "1." In this example, comparatively little storage is required to store tokens for the node transitions. Additionally, caching state transitions is particularly beneficial compared with the prior art method 200 when the application includes a sequence of calls that result in no net change in output state, such as an enable followed by a disable.

As previously described, transition cache 345 is particularly useful for applications where the state diagram has a large number of states and for which the application repeats certain state transitions. As another example, consider the example of a raster operations processor (ROP), also known as a fragment backend store unit. A ROP stores color into a frame buffer. In some implementations there may be 60-70 states. However, in practice only 10-20 of the states may be used and many of the state changes may be redundant enables disable commands. In this example, the conventional method 200 results in a large computational overhead to perform full hashing of all of the input states. In contrast, the use of a transition cache 345 results in a substantial reduction in computational overhead.

As previously described, the transition cache is preferably used an auxiliary to a conventional cache. In operation, the system needs to recognize that the overall state vector has taken on a previously-seen value. This can be performed by seeing if there is a hit in the transition cache. If there is no hit in the transition cache (a failure), then a lookup is performed in the conventional cache. However, in steady-state operation it may be possible to delete portions of the conventional cache if, for example, a period of time elapses without a failure. However, in this example, during construction the conventional cache is necessary.

While the transition cache of the present invention has been described for use with a conventional cache it will be understood that the transition cache of the present invention may also be used with other techniques to detect transitions back to an equivalent state besides a conventional cache. That is, a conventional cache can be viewed as one technique to recognize that the overall state vector has taken on a previously-seen value. As one example, instead of a conventional cache a calculus upon transition strings may be used to detect transitions back to an equivalent state. Empty strings are an easy case that causes a transition back to a known state. Another case arises if redundant state changes are filtered (i.e., setting variable X to value K when X already equals K) and the result is an empty string. In some cases, stored states may be reversible. If an in-edge string (e.g., Disable lighting) is found that is the opposite of the currently considered out-edge string (i.e., one that is to be added to the state graph) it may be possible to identify that the source node of the in-edge should be the destination node of the out-edge, i.e. reversibility. Binary variables (e.g., enable/disable lighting) are a special case of reversible variables. As another example, a conventional cache may' be replaced with a variation that is essentially an equivalent, such a looping over all nodes in the transition cache to generate all of the information required to detect transitions, which would result in basically a conventional cache.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many' modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics system, comprising:
   a graphics processing unit (GPU);
   a central processing unit (CPU) communicatively coupled to said GPU, said CPU having an associated memory for storing a software application operative to generate user commands, said user commands corresponding to input states requiring transformation for execution by graphics hardware of said GPU;
   an output state cache configured to cache output states, each output state corresponding to a transformation of an input state of said software application to a corresponding graphics hardware state of said GPU; and
   a transition cache, said transition cache mapping transitions in changing input state to changing output states;
   said graphics system being operative in a first mode of operation to utilize said output state cache to determine at least one output state based on at least one input state;

said graphics system being operative in a second mode of operation to utilize said transition cache and said output state cache to determine at least one output state based on at least one transition in input state.

2. The graphics system of claim 1, wherein said transition cache is used to generate pointers to output states of said output state cache.

3. The graphics system of claim 2, wherein said graphics system tracks changes to input state and said transition cache accesses a pointer based on a change to an input state.

4. The graphics system of claim 1, wherein said graphics system is configured to build a sequence of state changes and generate a lookup index for state transitions into said transition cache.

5. The graphics system, of claim 1, wherein said output state cache and said transition cache are generated by a graphics driver.

6. The graphics system of claim 1, wherein a graphics driver generates said output state cache and said transition cache, said graphics driver building a string of state changes and generating a lookup index for state transitions into said transition cache.

7. The graphics system of claim 6, wherein a token is generated for each input state, each token representing an application programmable interface (API) call.

8. The graphics system of claim 7, wherein said lookup index is generated by hashing said string.

9. The graphics system of claim 1, wherein said output state cache and said transition cache are implemented as separate caches.

10. The graphics system of claim 1, wherein said graphics system has said first mode of operation in which lookup keys are generated for an entire set of input user states to perform a lookup utilizing said output state cache to determine output state based on input state.

11. A graphics system, comprising:
a graphics processing unit (GPU);
a central processing unit (CPU) communicatively coupled to said GPU, said CPU having an associated memory for storing a software application operative to generate user input commands, said user input commands corresponding to input states requiring transformation for execution by graphics hardware of said GPU;
said graphics system mapping transformations of entire sets of input states to output states and caching the output states for reuse, each output state corresponding to a transformation of an input state of said software application to a corresponding graphics hardware state of said GPU;
said graphics system having a mode of operation in which transitions in input state to changing output states are tracked to generate a transition cache, said transition cache being used to generate pointers to access a cached output state based on a transition in input state.

12. The graphics system of claim 11, wherein said graphic system comprises an output state cache and said transition cache.

13. The graphics system of claim 12, wherein said graphics system is configured to build a string of state changes and generate a lookup index for state transitions into said transition cache.

14. The graphics system of claim 13, wherein a token is generated for each input state of said string, each token representing an application programmable interface (API) call.

15. The graphics system of claim 13, wherein said lookup index in generated by hashing said string.

16. The graphics system of claim 11, wherein said graphics system has a mode of operation in which lookup keys are generated for an entire set of input user states to perform a lookup utilizing an output state cache to determine output state based on input state.

17. A method of transforming input user states to output states for graphics hardware, the method comprising:
in a graphics system operating in a first mode of operation, caching transformations of input states to output states to generate a cache of output states for reuse;
in said graphics system operating in a second mode of operation, caching a representation of transitions of input states to output states to generate a transition cache of state transitions; and
in said graphics system operating in said second mode of operation, utilizing said transition cache to map an input state transition into an output state of said cache of output states.

18. The method of claim 17, wherein said caching a representation of transitions of inputs states to output states comprises:
building a string of state transitions; and
generating a lookup index from said string to pointers to output states.

19. The method of claim 18, wherein building a string comprises generating a token for each input command and utilizing said tokens to build said string.

* * * * *